E. B. Bigelow.
Loom Temple.
No. 3,925.    Patented Feb. 24, 1845.
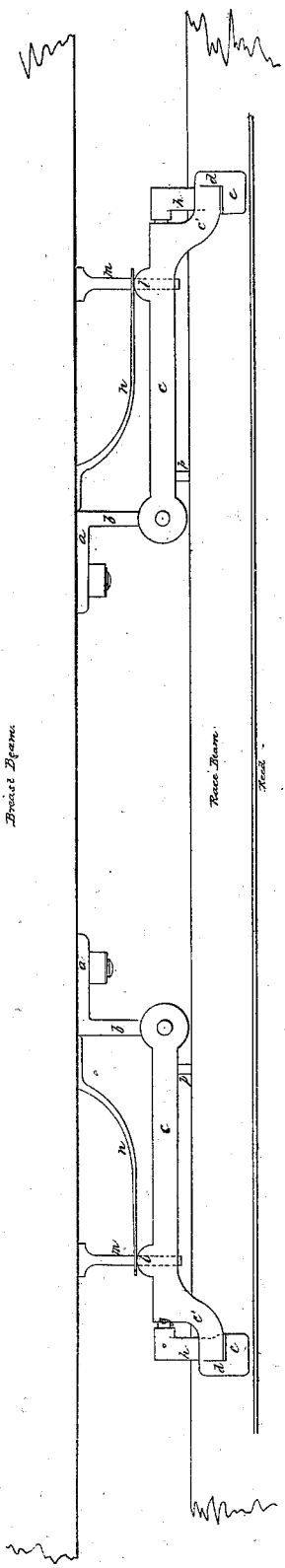
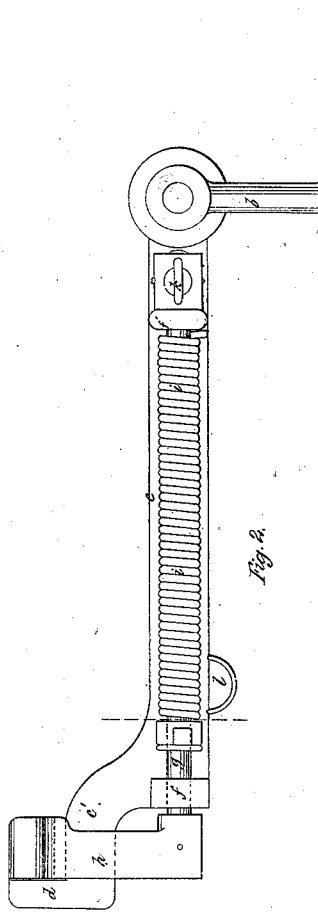
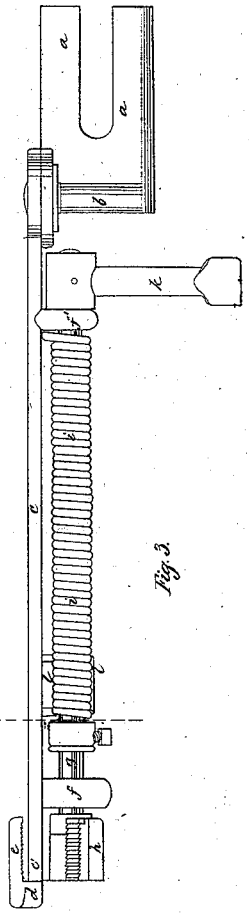
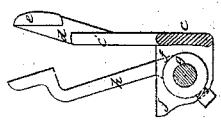
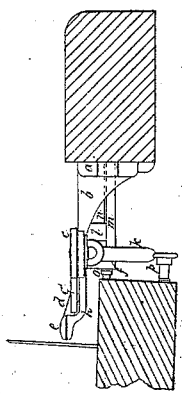

E. B. Bigelow.
Loom Temple.
No. 3,925.  Patented Feb. 24, 1845.
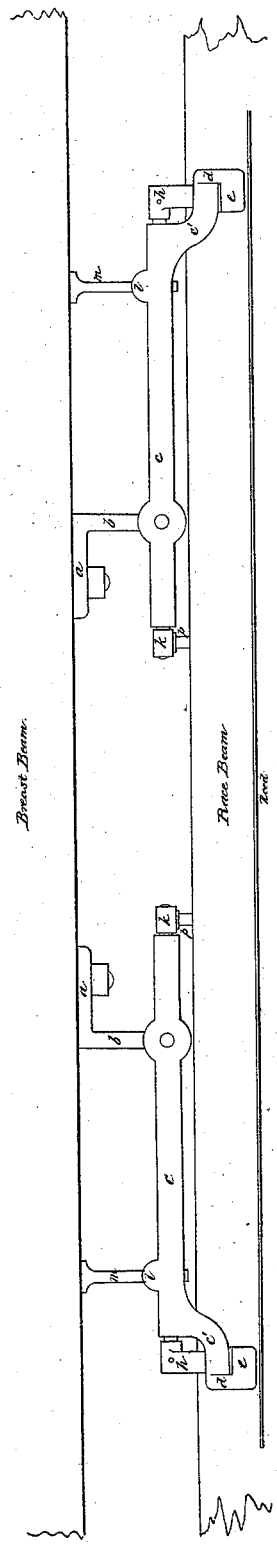
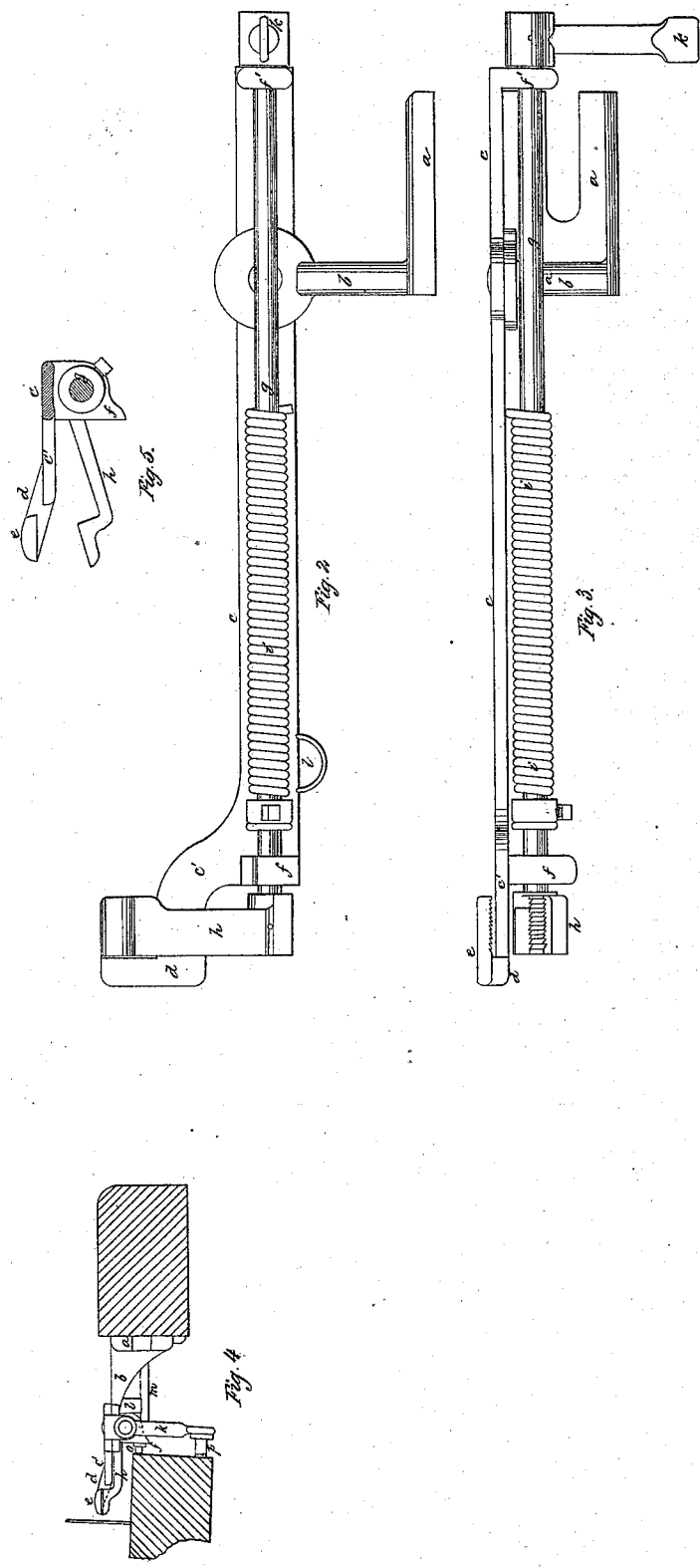

UNITED STATES PATENT OFFICE.

ERASTUS B. BIGELOW, OF BOSTON, MASSACHUSETTS.

IMPROVEMENT IN JAW-TEMPLES FOR WEAVING-LOOMS.

Specification forming part of Letters Patent No. 3,925, dated February 24, 1845.

*To all whom it may concern:*

Be it known that I, ERASTUS B. BIGELOW, of Boston, in the county of Suffolk and State of Massachusetts, have invented a new and useful Improvement in Temples for Power-Looms; and I do hereby declare that the following is a full, clear, and exact description thereof, reference being had to the accompanying drawings, which form a part of the same, in which—

Plate 1: Figure 1 is a representation of the temples attached to the breast-beam; Fig. 2, the temple detached, showing its under side; Fig. 3, an elevation of the temple or front view; Fig. 4, an end elevation. In Plate 2 the same views are shown as in Plate 1 of a modified construction of the temple to be used without a spring on the breast-beam to press it toward the reed. Fig. 5, in both plates, represents a section of the temple through C D of Figs. 2 and 3 with the jaws open.

The temple is composed of a flat iron plate *a*, having a slot in it by which it is screwed to the breast-beam, and from one end of this plate an arm *b* projects out horizontally at right angles thereto. The end of the arm terminates in a small circular piece, where a flat narrow bar *c* is bolted to it, so as to form a joint and allow the other end of said bar to vibrate horizontally. The movable end terminates in a curved arm *c'*, which commences at right angles to the bar and curves outward till it is parallel with the straight part *c*. The extreme end *d* turns toward the reed and curves up a little. The jaw *e* is joined to this and turns inward parallel with the reed. The under side of this jaw *e* is a little above the line of the upper surface of the bar *c*, with which it is connected. This is clearly represented in Figs. 4 and 5. There are also two projections *f f'* downward from the under side of the bar *c*, which form the collars or bearings for a rod or shaft *g*, situated under and parallel with the bar. This shaft extends out beyond the end of the bar and has an arm *h* affixed to it at the end. This arm extends out to the jaw *e* and forms the lower jaw of the temple. Around the shaft *g*, between the collars *f f'*, a spiral spring *i* is coiled that keeps the jaws closed. On the inner end of the shaft, near the fulcrum or joint of the temple, a straight arm *k* is attached that hangs down perpendicularly, as shown in Figs. 3 and 4, the lower end of it being flattened for a purpose hereinafter described. On the side of the bar *c* next the breast-beam there is a small projection *l*, that extends down a little below the shaft *g*, as shown in Figs. 3 and 4, and rests and slides on a projection *m*, attached to the breast-beam. The outer end of the temple is pressed toward the reed by a spring *n*, attached to the breast-beam and bearing against the projection *l* on the bar above named. The race-beam has a set-screw (see *o*, Fig. 4) inserted in the front side of it, which strikes against the projection *f* on the temple and bears it against the breast-beam as the lay comes up, thus preventing the jaws from striking the reed, while they can be adjusted to come as close to it as desired. There is also another set-screw *p*, Figs. 1 and 4, on the race-beam opposite the flattened end of the arm *k*, that is affixed to the shaft *g*. When the screw strikes the arm *k*, it causes the jaws to open while beating up, and as the lay retreats it allows the jaws to close before the reed leaves the face of the cloth, for it will be seen that the end of the temple where the arm *k* is situated turns on a stationary pivot, while the other end where the jaws are situated vibrates as the lay comes up and recedes.

I sometimes modify the construction of this temple by extending the bar *c* and shaft *g* out beyond the fulcrum. This modification is represented in Plate 2, where the same figures and letters are used as in the above, the only alteration being in the extension of said parts and dispensing with the spring *n*, which this arrangement admits. The temple may be further improved by extending the plate *a* out to the projecting piece or guide *m*, thus connecting the whole into one, the spring *n* being fastened to said plate, and the whole can be adjusted before it is fastened to the breast-beam.

Having thus fully described my improved temple, what I claim therein as my invention, and desire to secure by Letters Patent, is—

Having the movable jaw at one end and the lever by which it is operated at the other end of the rod $g$ and near to the joint which connects the bar $c$ to the beam, in combination with the long bar $c$, jointed to the breast-beam, so as to act when there is little or no motion, by which the operation is rendered more effective and the free action of the temple unimpeded and more certain.

E. B. BIGELOW.

Witnesses:
C. HASTINGS,
J. J. GREENOUGH.